United States Patent
Ruch et al.

(10) Patent No.: US 11,162,823 B2
(45) Date of Patent: Nov. 2, 2021

(54) SELF-SUPPORTED PORTABLE SENSOR FOR LIQUIDS

(71) Applicant: International Business Machines Corporation, Armonk, NY (US)

(72) Inventors: Patrick Ruch, Pratval (CH); Aaron Cox, Sherman, CT (US); Yuksel Temiz, Zug (CH)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 16/676,166

(22) Filed: Nov. 6, 2019

(65) Prior Publication Data

US 2021/0131837 A1 May 6, 2021

(51) Int. Cl.
*G01D 11/30* (2006.01)
*G01D 11/18* (2006.01)
*G01D 11/24* (2006.01)

(52) U.S. Cl.
CPC ............. *G01D 11/30* (2013.01); *G01D 11/18* (2013.01); *G01D 11/245* (2013.01)

(58) Field of Classification Search
CPC ....... G01D 11/30; G01D 11/18; G01D 11/245
See application file for complete search history.

(56) References Cited

U.S. PATENT DOCUMENTS

| 5,065,892 A | 11/1991 | Lukez |
| 9,629,952 B2 * | 4/2017 | Heppe ................ A61M 1/3653 |
| 2010/0000348 A1 | 1/2010 | Baumfalk |
| 2013/0072870 A1 * | 3/2013 | Heppe ..................... H01R 4/28 |
| | | 604/111 |
| 2017/0138928 A1 * | 5/2017 | Reynolds ......... A61B 5/150022 |

FOREIGN PATENT DOCUMENTS

| CN | 101311711 A | 11/2008 |
| CN | 104316666 A | 1/2015 |

* cited by examiner

*Primary Examiner* — Jamel E Williams
(74) *Attorney, Agent, or Firm* — Brian D. Welle

(57) ABSTRACT

A portable sensor includes a probe and a housing. The probe comprises a sensing part with one or more sensing elements, while the housing is designed to secure the probe such that the sensing part extends outside the housing. The portable sensor defines a gap between the probe and a surface of the housing that is configured to receive a rim of a liquid container such that the portable sensor can slot onto a rim of a liquid container, so as to allow hand-free measurements.

19 Claims, 6 Drawing Sheets

SELF-SUPPORTED PORTABLE SENSOR FOR LIQUIDS

BACKGROUND

Many types of sensors are available in today's marketplace. Many of these sensors are configured to gather data about liquids. For example, liquid sensors may identify such liquid properties as pH, ion concentration, temperature, or the like. These liquid sensors may gather this data for applications ranging from quality assurance to clinical assays. Some of these sensors are stationary sensors, such that liquids are brought to the stationary sensors in order for the data to be gathered.

SUMMARY

Aspects of the present disclosure relate to a portable sensor. The portable sensor includes a probe that includes a sensing part with one or more sensing elements configured to sense properties of a liquid. The portable sensor also includes a housing that defines both a first surface portion and a second surface portion. The housing is configured to secure the probe relative to the housing such that the sensing part protrudes from the second surface portion and thereby extends outside the housing in a direction substantially parallel to the to the first surface portion, thereby defining a gap between the first surface portion of the housing and a portion of a side surface of the sensing part of the probe. The gap has an open end and a closed end, the closed end defined by the second surface portion of the housing. The open end as defined by the portable sensor is configured to receive a rim of a liquid container.

Other aspects of the present disclosure relate to a method utilized by a portable sensor. A rim of a liquid container is received via a gap defined by a portable sensor. The portable sensor includes a probe comprising a sensing part with one or more sensing elements configured to sense one or more properties of a liquid of the liquid container. The portable sensor also includes a housing defining both a first surface portion and a second surface portion, wherein the housing is configured to secure the probe relative to the housing such that the sensing part protrudes from the second surface portion in a direction substantially parallel to the to the first surface portion to define the gap between the first surface portion of the housing and a portion of a side surface of the sensing part of the probe. The gap has an open end and a closed end, the closed end defined by the second surface portion of the housing while the open end as defined by the portable sensor configured to receive a rim of a liquid container. The method also includes sensing, via the one or more sensing elements, the one or more properties of the liquid.

Other aspects of the present disclosure relate to portable sensor that includes a probe that itself includes a sensing part with one or more sensing elements configured to sense properties of a liquid. The sensing elements including one or more electrodes. The portable sensor also includes a printed circuit board having electronic components and a universal serial bus (USB) thereon. The portable sensor also includes an elastically deformable clamp. The portable sensor also includes a housing defining a partial cylinder with a cutout that is defined by a first surface portion and a second surface portion of the housing. The portable sensor also includes a cap that is shaped complementarily to the cutout such that the cap is configured to receive and cover the probe. The housing includes two components configured to secure the probe relative to the housing such that the sensing part protrudes from the second surface portion and thereby extends outside the housing in a direction substantially parallel to the to the first surface portion to define a gap between the first surface portion of the housing and a portion of a side surface of the sensing part of the probe. The gap has an open end and a closed end, the closed end defined by the second surface portion of the housing while the open end is defined by the portable sensor configured to receive a rim of a liquid container. The elastically deformable clamp is configured to secure the two components of the housing.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
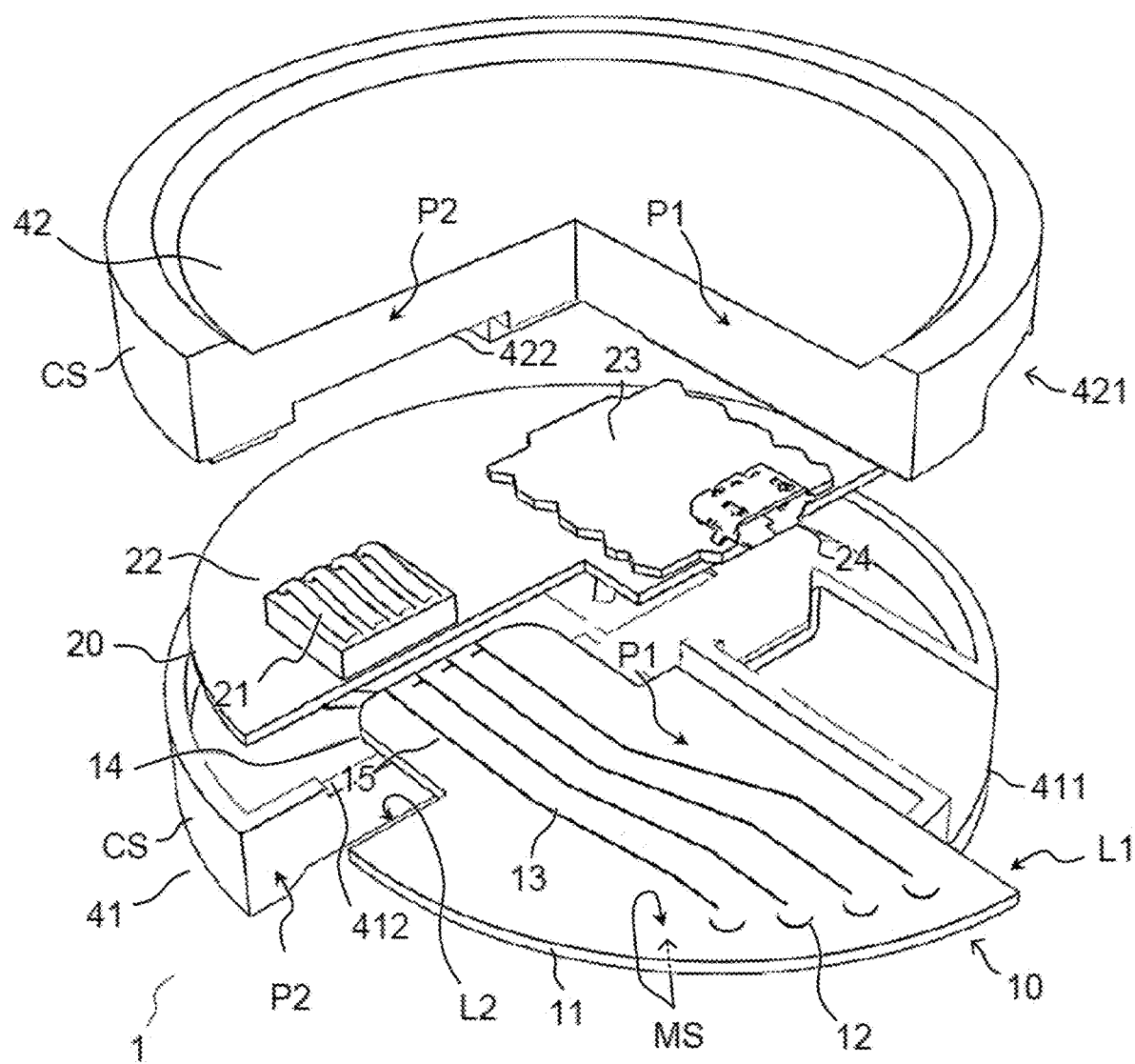
FIG. 1 depicts a partially exploded view of an example portable sensor according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate in general to the field of portable sensors for liquids and related portable sensor packages. In particular, it is directed to a portable sensor with an open-ended gap between the sensing probe and a housing, whereby the portable sensor can slot onto a rim of a liquid container such as a drinking glass, in a self-supported fashion, thereby enabling hand-free measurement. While the present disclosure is not necessarily limited to such applications, various aspects of the disclosure may be appreciated through a discussion of various examples using this context.

Many conventional liquid sensors may be gained to gather any manner of data from sensors. Some of these are stationary liquid sensors that are part of a large assembly that is impractical to move (e.g., as a result of the weight of the sensor assembly or as a result of the sensor assembly being configured to be permanently secured in one place via welds or bolts or the like). These sensors may be in a laboratory or manufacturing plant or the like, such that liquids are brought to these stationary sensors. Other conventional sensors may be handheld portable sensors that are configured to be held by the hand of a user while the user submerges a portion of the sensor in (or otherwise gets the sensor within a sensing proximity of) the relevant liquid. However, it may be cumbersome or dangerous or the like for a user to have to hold such a sensor in place during all measurements, depending on the liquid being measured and the number of measurements that need to be gathered.

Aspects of this disclosure are related to systems and methods that may help these issues. For example, aspects of this disclosure relate to a portable sensor that is configured to be self-supported on a liquid container while gathering data of liquid within the liquid container. A probe of the portable sensor may gather the data within a housing of the portable sensor. The portable sensor may be configured to slot onto a rim of a liquid container to support itself during measurement.

For example, FIGS. 1-5D depict a portable sensor 1 that includes a probe 10 within two housing components 41, 42, where the portable sensor 1 is configured to be self-supported on a liquid container while gathering data of liquid within the liquid container. In some examples, these two components 41, 42 may be superimposed upon a full assembly of the portable sensor 1, such that the two fit together and integrate together to form the housing 41, 42. The general shapes and relative sizes of components of portable sensor 1 depicted within FIGS. 1-5D are provided for purposes of example only, as other shapes and relative sizes that are consistent with this disclosure are also possible.

The probe 10 of the portable sensor 1 comprises a sensing part 11, which includes one or more sensing elements 12. The probe 10 may be an essentially planar substrate, thus having two major surfaces MS (see FIG. 1) with an edge that extends between the two major surfaces. A first portion of the edge of the sensing part 11 is denoted by reference L1, see FIGS. 1 and 2, while a second portion of the edge is denoted by reference L2. The planar substrate of the probe 10 may have any suitable shape, such that the edge defines portions L1, L2.

One or more sensing elements 12 of the sensing part 11 may be arranged to extend across one or both major surfaces MS of the substrate, as depicted in FIGS. 1-5. The sensing elements 12 may be embedded within the substrate of the probe 10, attached to an outer surface of the probe 10 or some combination of both. In embodiments where the sensing elements 12 are not directly in contact with the liquid L (e.g., in contact once the portable sensor 1 is in operation and supporting itself on a liquid container), the sensing part 11 may comprise one or more surfaces that are configured to define one or more flow paths for the liquid. The flow path(s) may be formed by patterned structures (such as microfluidic channels), and/or a wicking medium (like a fibrous/porous medium such as paper or a nitrocellulosic material), to guide the liquid towards the sensing elements 12, which may be arranged in any suitable place in the device.

In some embodiments, the sensing elements 12 include electrodes. In general, the sensing elements 12 may possibly comprise polymeric membranes (comprising ionophores), conductive and/or insulating polymers, chalcogenide glasses, noble metals (such as Pt, Au, and Ru) and/or ignoble metals (also called anodic metals or corroding metals, such as Ni, Fe, and Ti), carbonaceous materials (such as graphitic carbon, activated carbon, diamond-like carbon, and/or graphene), or the like. The sensing elements 12 may be configured to sense and/or gather data relating to one or more properties of a liquid, such as a pH, ion concentration, temperature, or the like.

Figure 2:
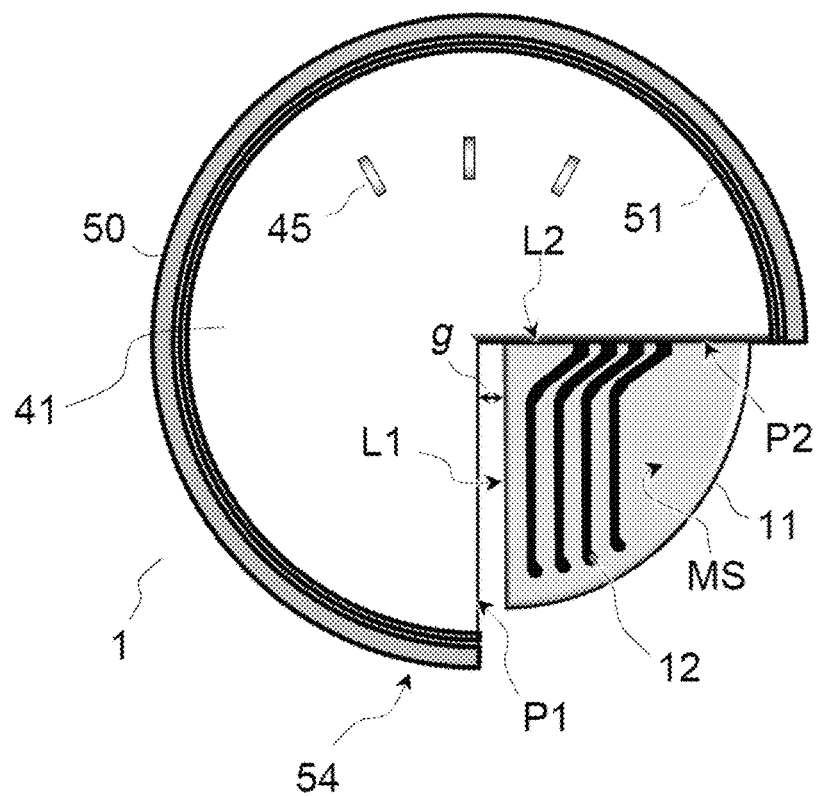
FIG. 2 depicts a side view of the portable sensor of FIG. 1.

The housing 41, 42 defines first surface portion P1 and a second surface portion P2, see FIGS. 1 and 2. The housing 41, 42 is configured to secure the probe 10 relative to housing 41, 42 such that the sensing part 11 of the probe 10 protrudes from the second surface portion P2, see FIG. 2. The probe 10 thus extends (at least partly) outside the housing 41, 42, along the first surface portion P1. In some examples, a portion L1 of the edge of the sensing part 11 of the probe 10 may extend substantially parallel to the surface portion P1 of the housing 41, 42.

The probe 10 is configured to protrude from the second surface portion P2 of the housing 41, 42 to define a gap g between the first surface portion P1 of the housing 41, 42 and the edge surface portion L1 of the probe 10, as depicted in FIG. 2. And as further seen in FIG. 2, the gap g has an open end (at the bottom of the sensing part 11 of the probe, in the orientation of FIG. 2). The opposite end (on top in FIG. 2) of the gap g is closed by the second surface portion P2 of the housing 41, 42. In other words, the portable sensor 1 defines gap g such that the portable sensor 1 defines a notch (in which a liquid container may be received). As depicted in FIG. 2, the edge surface L1 of the sensing part 11 may extend substantially parallel to said first surface portion P1 (subject to backlash), though in other examples the two surfaces L1, P1 may define an angle relative to each other. For example, edge surface L1 and first surface portion P1 may define an angle such that gap g is relatively greater at the open end and relatively smaller at the closed end, such that a liquid container is funneled into the notch defined by the portable sensor 1.

Figure 3:
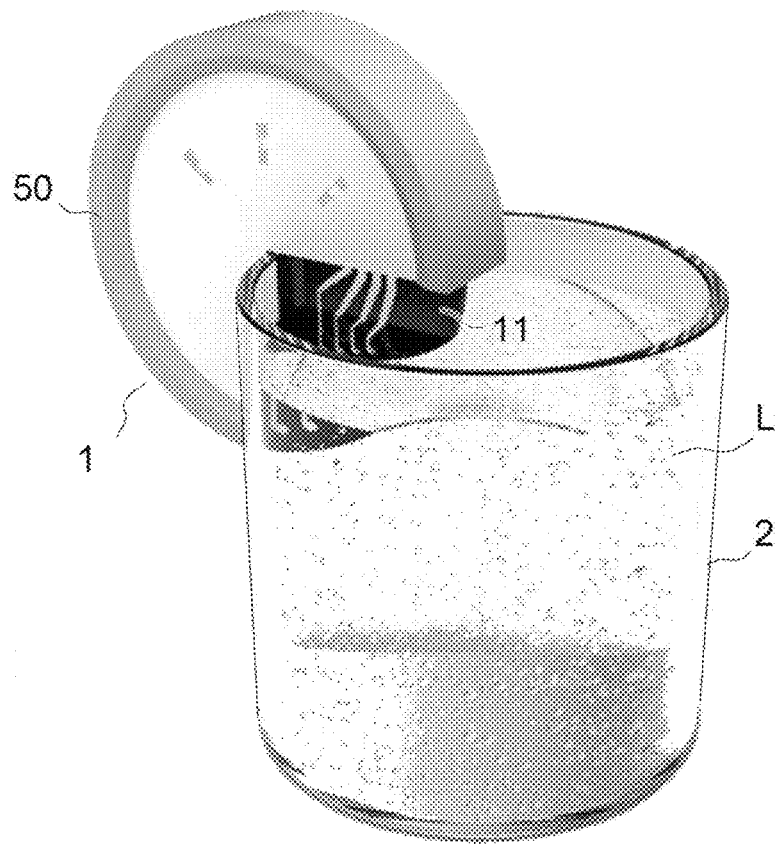
FIG. 3 depicts an isometric view of the portable sensor of FIG. 1 slotted onto the rim of an example liquid container.

In this way, portable sensor 1 may be configured to receive a liquid container 2 (such as a drinking glass or a beaker) as depicted in FIG. 3. For example, portable sensor 1 can "slot" onto the rim of the container 2 by receiving this though the open end of the gap g. Once the notch of the gap g receives a rim of a liquid container 2, the sensing elements 12 of the probe 10 can dip in a liquid L in the container 2. The gap g may be between 1 and 5 millimeter (mm) (e.g., 1 or 2 or 3 mm). More generally, portable sensor 1 may define the gap g such that the portable sensor 1 is configured to slot (via the gap) onto any container of interest. This advantageously enables hands-free (e.g., self-supported) measurements.

In some examples, the gap g as defined by portable sensor 1 is configured to prevent other components (other than the sensing part 11 of the probe 10) to contact the liquid L. Thus, the portable sensor 1 is configured to reduce potential contamination of the liquid L and also reduce an amount of portable sensor 1 that would need to be cleaned following a measurement, therein improving the reliability and the reproducibility of the measurements performed with the portable sensor 1 compared to conventional portable sensors.

The portable sensor 1 can be embodied as a compact, integrated multi-sensor package, self-supporting on a container's rim. In some embodiments, the portable sensor 1 may be designed as a kit of parts, mounted in a few seconds, without any fastening means such as threads, adhesives, or the like (e.g., but rather, by assembling the portable sensor 1, the portable sensor 1 may be inherently configured to support itself on a rim of a liquid container 2). The following description further recites methods for assembling such sensor packages.

In some examples of FIGS. 1-4 the probe 10 is removably fixed to the housing 41, 42, thanks to a snap fit mechanism provided by connectors 14, 21. A snap-fit mechanism or a similar interlocking mechanism may improve an ability of a user to secure the probe 10 with the housing 41, 42. In other examples, the probe 10 may be screwed to the housing or otherwise secured within the housing 41, 42.

Figure 4:
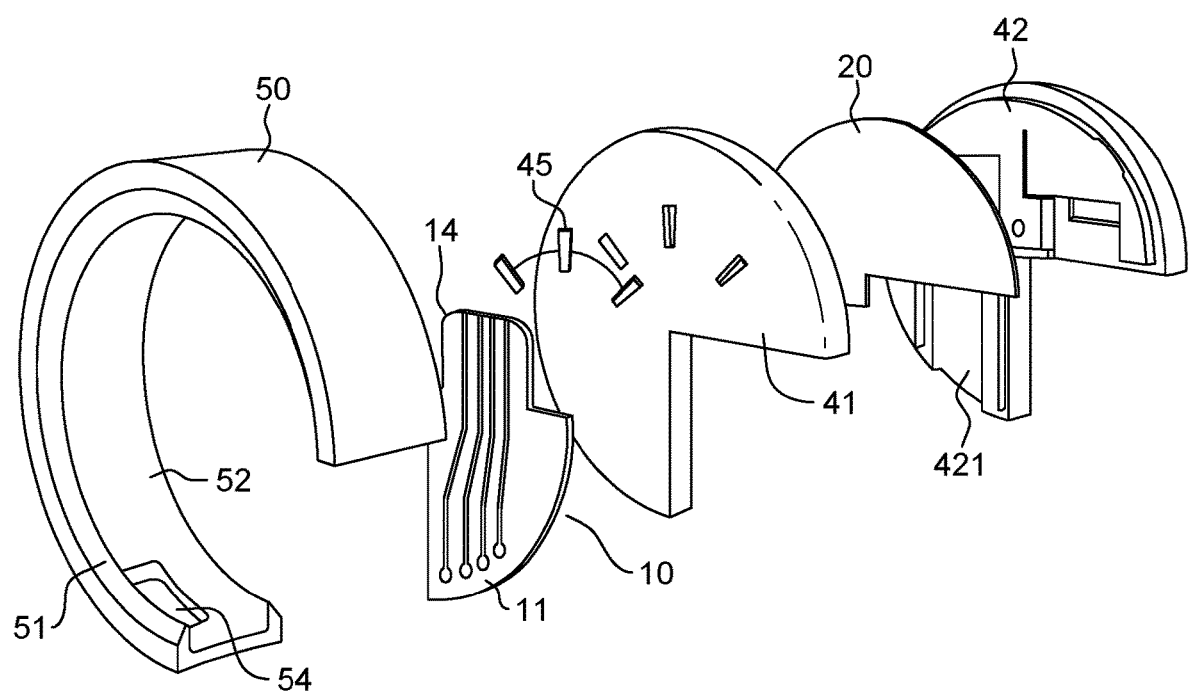
FIG. 4 depicts an expanded exploded view of the portable sensor of FIG. 1.

As further seen in FIGS. 1, 2, and 4, the probe 1 may include a printed circuit board (PCB) 20 as encapsulated/housed by the housing 41, 42. The PCB 20 may include electronic components 22, 23 arranged thereon, so as to process signals obtained from the sensing elements 12. As depicted, the housing 41, 42 may include two superimposed components that are configured to enclose the PCB 20. The sensing elements 12 of the probe 10 can connect to at least one of said electronic components 22, 23, e.g., via connectors 21 and an electrical component 22 of an analog-to-digital convertor (ADC).

In some examples, as a result of the housing 41, 42 being configured to utilize a snap-fit mechanism, it may be relatively difficult for a user to disassemble the portable sensor 1 after use if the snap-fit mechanism has a relatively high overlap (e.g., such that relatively more force is needed to snap the two components of the housing 41, 42 together). As such, in some examples the portable sensor 1 may comprise an elastically deformable clamp 50 (see FIG. 4) for securing the two superimposed components 41, 42, such that housing 41, 42 may be secured together even with a relatively smaller amount of overlap. As further illustrated in FIGS. 4 and 5, the housing 41, 42 may be shaped as a "partial" cylinder. Put differently, the housing 41, 41 may substantially define a flat cylinder with quarter of the cylinder being longitudinally removed, while the deformable clamp 50 may similarly be shaped as a partial ring (e.g., again with a removed quarter), to allow the housing 41, 42 to be inserted and rotated in the ring, so as to get clamped therein.

A portable sensor 1 as shown in FIGS. 1-5 may be configured such that the portable sensor 1 can be assembled and/or disassembled in seconds. Given this relatively fast assembly and disassembly, it may be relatively quick and easy to remove and/or replace the probe 10 from the portable sensor 1 as well. All this is now described in more detail, in reference to particular embodiments of the invention.

Figure 5A:
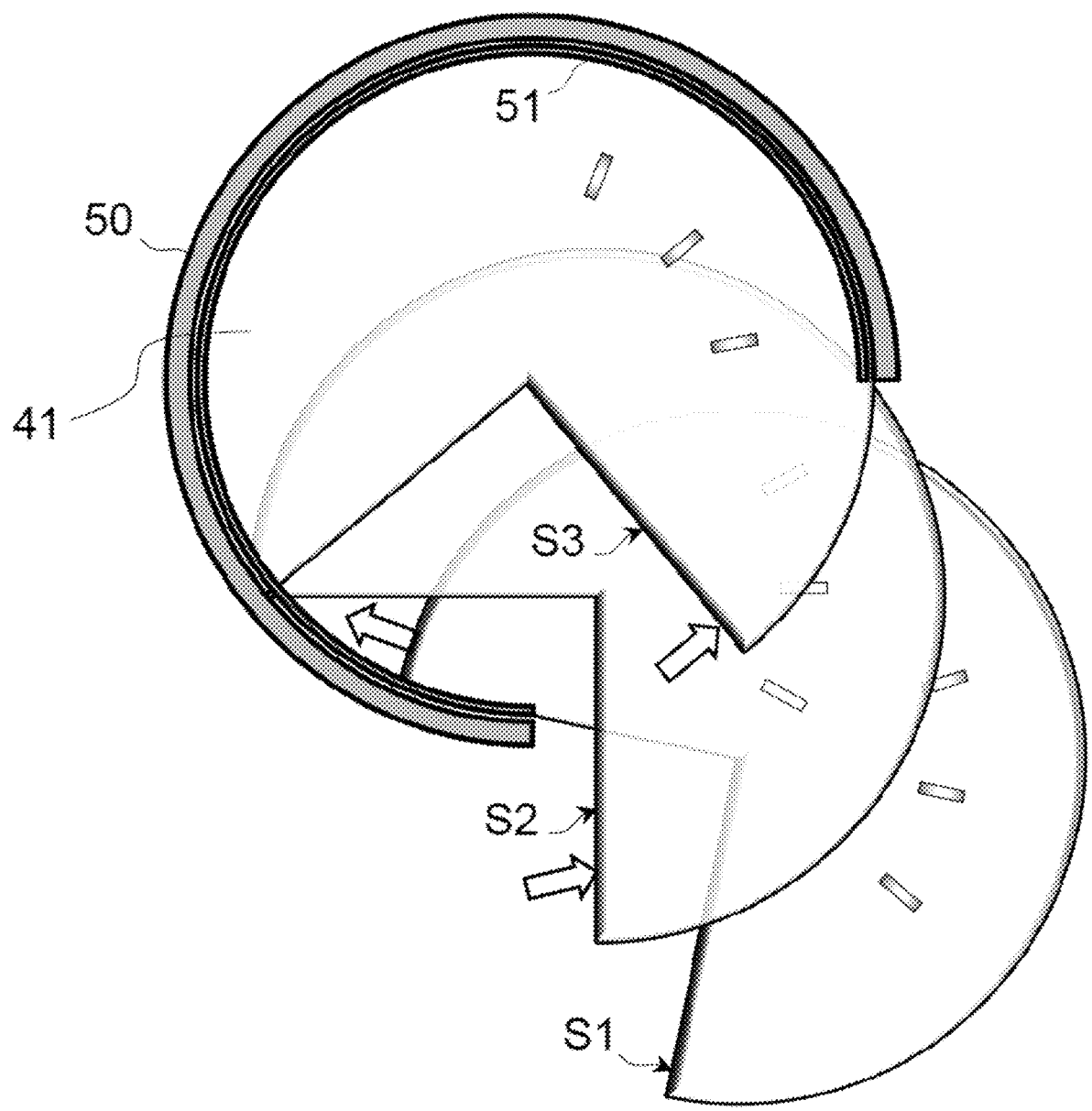
FIG. 5A depicts sequential side views of assembling of the portable sensor of FIG. 1 by rotating an inner partial assembly of the portable sensor into an outer clamp of the portable sensor.
Figure 5B:
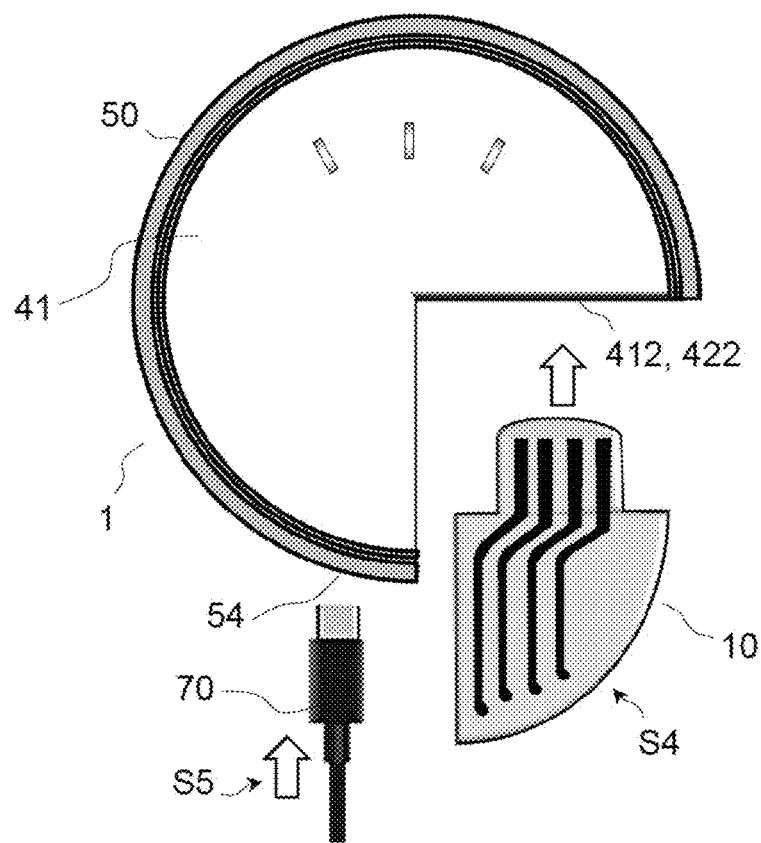
FIGS. 5B and 5C depicts sequential side views of the portable sensor of FIG. 1 receiving an universal serial bus (USB) for data transfer.

The probe 10 may comprise a connector 14 of an insertion member, in addition to the sensing part 11, see FIGS. 1, 4, and 5B. The insertion member connector 14 can for instance be provided as a tab protruding from the portion L2 of the probe 10. This insertion member connector 14 can be removably inserted in a slot 412, 422 defined in the second surface portion P2 of the external surface of the housing 41, 42. Such an insertion member connector 14 makes it easy to removably attach the probe 10 to the housing 41, 42. If necessary, the insertion member connector 14 may feature radially protruding elements that are configured to provide additional resistance against out-of-plane rotation of the probe 10 with respect to the main plane of the PCB 20. This, in turn, makes it possible to maintain a better-defined gap g and improve the electrical contact between the electrical pads 15 and the connectors 21. Further, in addition to the connector 14 being an insertion member improving an ease of use of the portable sensor 1, being an insertion member may further enable fabricating the probe 10 as a flat substrate with a relatively constant thickness. In this way, probe 10 may define an insertion member connector 14 that is dimensioned to be relatively robust, further enabling a flat probe 10 that may be relatively easy to store.

In other examples, portable sensor 1 may include more or less or different fixation mechanisms to secure probe 10 relative to other components of portable sensor 1. For example, the probe 10 may define a recess that may be configured to mate with a protruding feature defined by the housing 41, 42. In this way, the protruding feature may be inserted in the recess of the probe 10 to forming another snap-fit mechanism within the portable sensor 1. In certain examples, the recess may be threaded such that some or all of the protruding feature (or a bolt inserted through or in lieu of the protruding feature) may thread into the recess.

As discussed earlier, the housing 41, 42 may contain a PCB 20 with various electronic components 22, 23 and other features such as connector 21, and a universal serial bus (USB) receptacle 24 (described below) arranged thereon. As noted earlier too, the sensing elements 12 of the probe 10 may include one or more electrodes. In some examples, multiple electrode sensing elements 12 are involved, so as to provide a multiple array of sensing elements 12, as assumed in FIGS. 1-5. This way, multiple measurements may be concurrently gathered, see FIGS. 3 and 5C. The following discussion is written with the sensing elements 12 including multiple electrodes plated or printed on a major surface MS of the probe 10, though in other examples other types of sensing elements 12 consistent with this disclosure may be utilized.

The electrode sensing elements 12 can be connected to one or more of the electronic components 22, 23 on the PCB 20, via the insertion member connector 14. For example, the insertion member connector 14 of the probe 10 may comprise electrical pads 15, see FIGS. 1, 4, and 5B. In addition, the sensing part 11 of the probe 10 may further comprise electrical conductors 13 connecting the electrode sensing elements 12 to the electrical pads 15. Such electrical conductors 13 may connect the electrode sensing elements 12 to respective electrical pads 15 on the insertion member connector 14. The conductors 13 may include electrically conducting traces printed on a major surface MS of the probe 10 (e.g., similar to how the electrodes may form the lower ends of the conductors 13 and may consist of enlarged areas of printed metal, as in the examples of FIGS. 1, 4 and 5B).

As best seen in FIG. 1 or 2, the conducting traces of conductors 13 may extend from one end of the sensing part 11 of the probe 10 (i.e., close to the "lower" edge of the probe 10) to an opposing end of the sensing part 11 (i.e., near an "upper" edge of the probe 10 at the electrical pads 15 on the insertion member connector 14). Similar traces may be provided on the PCB 20, to connect the various electronic components 22, 23 and other features such as connector 21 and USB receptacle 24.

The electronic components 22, 23 may include an ADC electronic component 22 and a microcontroller electronic component 23. In some examples, light-emitting diodes (LEDs) 45 may be connected to components on the PCB 20, providing visual feedback on one or more states of the measurement/sensing as the measurement/sensing proceeds. For example, the portable sensor 1 may be configured to cause the LEDs 45 to indicate when sensing has begun, when sensing is complete, when sensing are possible (e.g., due to the sensing elements 12 contacting the liquid), when sensing is not currently possible (e.g., due to the sensing elements 12 not contacting the liquid), or the like.

In some embodiments, a spring-loaded connector 21 (e.g., a 70AAJ-4-MOG 4-pin connector from Bourns Inc., or a HSEC8-110-01-S-DV-A 20-pin connector from Samtec Inc.®) may be used to enable an easy and reliable electrical connection between the electrical pads 15 on the probe 10 and the electronic components on the PCB 20. An ADC electrical component 22 (e.g., 16-bit 4-channels ADS1115 from Texas Instruments®) may be used to measure voltages of the electrodes digitally. In some examples, additional analog front-end components, such as amplifiers, filters, current-to-voltage convertors, can be used depending on the measurement principle chosen. In examples where more than four electrodes gather measurements, multiple units of the ADC or an analog multiplexer (e.g., 74HC4067A from Nexperia Inc.®) can be used. A compact microcontroller board electrical component 23 (e.g. Beetle Arduino board from DFrobot® comprising an ATmega32U4 from Microchip Technology®) is used to process incoming data from the ADC and control other peripheral components, such as LEDs or a wireless communication module. In addition, a USB receptacle 24 may be provided on the PCB 20 to enable connection to, e.g., a mobile computing device. In examples where the electronics are powered via a battery within the portable sensor 1, the USB receptacle 24 can be used to charge the battery. Other physical connectivity means may be contemplated, in other examples. Moreover, in other examples, additional electronic components may be provided on the PCB, such as a Bluetooth module to allow a wireless connection to a peripheral device and a rechargeable battery, if needed.

As noted earlier, the housing 41, 42 and the insertion member connector 14 may possibly form a snap-fit mechanism, so as to removably attach the probe 10 to the housing 41, 42. In that respect, and as seen in FIG. 1, the PCB 20 may further comprise spring-loaded connectors 21. These connectors 21 may be arranged so as to contact respective ones of the electrical pads 15 of the insertion member connector 14 once this member connector 14 is inserted in the slot 412, 422 defined in the surface of the housing 41, 42. The spring-loaded connectors 21 may possibly form part of the above-mentioned snap-fit mechanism. That is, the probe 10 may be secured in position (after insertion of the insertion member connector 14 in the slot 412, 422) thanks to the spring-loaded connectors 21. The probe 10 may be secured by the sole spring-loaded connectors 21 by the repelling force exerted on the electrical pads 15 after insertion of the connector 14.

In some examples, any other suitable snap-fit mechanism may be involved, in addition to or instead of the spring-loaded connectors 21. Mere electrical pads may, in that case, be provided on the PCB 20 (instead of spring-loaded connectors). These pads may come in mechanical contact the electrical pads 15 of the insertion member connector 14 upon insertion of the probe 10.

As illustrated in the exploded view of FIG. 4, the housing 41, 42 may advantageously consist of two superimposed components 41, 42, which are assembled so as to encapsulate the PCB 20. Once assembled, the two superimposed components of the housing 41, 42 form a structure for the PCB 20 which may, e.g., be shaped as a partial cylinder, as assumed in FIGS. 1-5. The external surface of the housing comprises multiple surface portions, including said first surface portion P1 and said second surface portion P2, see FIG. 1.

A first portion L1 of the edge of the probe 10 extends vis-à-vis the first surface portion P1, and potentially parallel thereto, as best seen in FIG. 2. The open-ended gap g allows the portable sensor 1 to be placed on a container 2, see FIG. 3, so as to slot onto the rim of the container 2. This way, the electrode sensing elements 12 can dip into a liquid L placed in the container 2, whereby the liquid L can be analyzed in a hand-free fashion using the portable sensor 1. The user can, for instance, trigger and analyze measurements using a peripheral device (not shown) connected to the portable sensor 1, such as using a USB plug 70, see FIG. 5C.

As further illustrated in FIGS. 2-5, the two superimposed components of the housing 41, 42 may be secured by an elastically deformable clamp 50. This clamp 50 may be shaped as a partial ring clamping the partial cylinder formed by the assembled components of the housing 41, 42.

Once assembled, the two components of the housing 41, 42 form an assembly that encloses the PCB 20. The PCB 20 can be roughly shaped as a half-circle and housed in the components of the housing 41, 42, thereby forming part of the assembly of the portable sensor 1. Now, the external surface of the housing 41, 42 may essentially be shaped as a partial cylinder, i.e., a 3D shape with two major surfaces (the top and bottom surfaces in FIG. 1 or the front and rear surfaces in FIG. 2) connected by a side (lateral) surface. The side surface includes the surface portions P1, P2. That is, the partial cylinder shows a cutout, i.e., a void (a missing quarter in the drawings) that extends from one of the major surfaces of the external surface of the housing 41, 42 to the other. In other words, the cutout portion interrupts both the major surfaces and the cylindrical side surface of the partial cylinder. The surface portions P1, P2 are located at the level of the cutout portion and define this quarter cutout. Put differently, the first and second surface portions P1, P2 correspond to the concave side surfaces defined by this void.

As further assumed in the accompanying drawings, the two surface portions P1, P2 may be contiguous, though this is not a strict requirement. In that case, the two surface portions P1, P2 may further be contiguous with (e.g., externally linked by) a residual portion of the side surface that links the major surfaces of the housing 41, 42. This residual side surface portion corresponds to the partial cylindrical surface CS that results from the cutout. In addition, the partial cylinder formed by the housing 41, 42 may have a form factor, to make it convenient for the portable sensor 1 to be clamped and slot onto a container rim. Typically, the height of the partial cylinder will be less than its radius. This height may be less than two centimeters. For example, the height may be one centimeter.

Consistent with the partial cylinder shape of the housing 41, 42, the deformable clamp 50 may define a cutoff portion that results in a partial ring as illustrated in FIGS. 4 and 5. In addition, a linear slide may be defined in an inner (curved) surface of the ring. The curved surface may notably be lined by radial, elastically deformable edges 51, 52, as best seen in FIG. 4. Note, the cutoff portion of the clamp 50 need be sized so as to allow insertion of the housing 41, 42 in the deformable clamp 50, so as for the partial cylindrical surface CS of the housing 41, 42 to engage in the linear slide and get clamped by the elastically deformable edges 51, 52, as illustrated in FIG. 5A.

Namely, after having assembled the components of the housing 41, 42 (with the PCB 20 sandwiched therein), this partial assembly of the portable sensor 1 can be inserted in the partial ring 50, step S1 in FIG. 5A, pushed further within the partial ring 50, step S2, so as for the cylindrical (side) surface of the assembly to engage in the linear slide (between the edges 51, 52, which may require to force the assembly between the elastically deformable edges) and be rotated therein, step S3. In other words, the assembly 20, 41, 42 is inserted S1, and then rotated S2, S3 into the partial ring 50.

The partial ring 50 shown in FIG. 4 forms a peripheral retaining feature that is configured to deform elastically to accommodate the assembly during rotation and springs back into shape when the assembly is fully enclosed within the linear slide. Again, no further attaching means may be required and the partial assembly of the PCB 20, and components of the housing 41, 42 can be clamped in the ring 50 within, e.g., a few seconds.

As noted earlier, the probe 10 may be provided as an essentially planar substrate, similar to a PCB. The electrode sensing elements 12 can be printed on a major surface (e.g., one of the top or bottom surface, i.e., a main surface) MS of the sensing part 11 of the probe 10. This major surface MS is perpendicular to the side surface of the probe and, in particular, to the side surface portion L1 (of the sensing part 11) that extends opposite to the first surface portion P1 of the housing 41, 42, once the probe 10 is attached to the housing.

The sensing part 11 of the probe 10 may notably show a second side portion L2 (at the level of the upper edge in FIG. 2), from which the insertion member connector 14 protrudes, wherein the second side portion L2 is essentially perpendicular to the first side portion L1. Once attached to the housing 41, 42, the side surface portion L2 extends opposite to (typically parallel to and possibly in mechanical contact with) the surface portion P2 defined by the cutout of the housing 41, 42. In the example of FIGS. 1-5, the major surface MS of the sensing part 11 may be perpendicular to each of the side surface portions L1 and L2 of the sensing part 11. Note, the length of the sensing part 11 (as measured vertically in FIG. 2) may roughly correspond to the radius of the partial cylinder formed by the housing 41, 42, for example.

As further assumed in FIGS. 1-5, the surface portions P1 and P2 of the external surface of the housing 41, 42 may extend at a substantially right angle from each other (e.g., where an angle is "substantially" a right angle when it visually approximates a right angle and is within 5° of a right angle). The probe may be shaped accordingly. In this way, the probe 10 may be inserted S4 (FIG. 5B) parallel to the first surface portion P1 of the external surface of the housing 41, 42, with the insertion member connector 14 inserted perpendicularly to the second surface portion P2. Providing a right angle may simplify both the insertion of the probe 10 for attachment and the de-insertion of the probe. In that respect, the major surface MS may be shaped as a quarter circle, whereby the portable sensor 1 has, as a whole, an approximate circular section. In this way, the convex shape accordingly obtained for the portable sensor 1 may lower a risk of accidental collisions or manipulation error when the portable sensor 1 is in operation. In some examples, this angle may somewhat differ, e.g., depending on the shape actually desired for the probe, it may for example be between 80 and 100°, or even between 70 and 110°. In addition, other examples can be contemplated, wherein the two portions P1 and P2 are not necessarily contiguous, as noted earlier.

The clamp 50 may further comprise a radial slot 54 arranged so as to come vis-à-vis a conduit 411, 421 provided in the housing 41, 42 (i.e., upon rotating the housing 41, 42 in the clamp 50), wherein the conduit 411, 421 is aligned with a direction of connection to the USB receptacle 24. Thus, a USB plug (or any other suitable connector) can be inserted S5 through the radial slot 54 in the conduit 411, 421 and thus connected to the USB receptacle 24, see FIG. 5B. Note, both the radial slot 54 and the conduit 411, 421 may be formed in halves, on each component of the housing 41, 42, see FIG. 1. Besides the conduit 411, 421, various compartments can be provided in one or each component of the housing 41, 42 for accommodating the various components 21-24 of the PCB 20, as well as the PCB 20 itself, see FIG. 4.

Figure 5C:
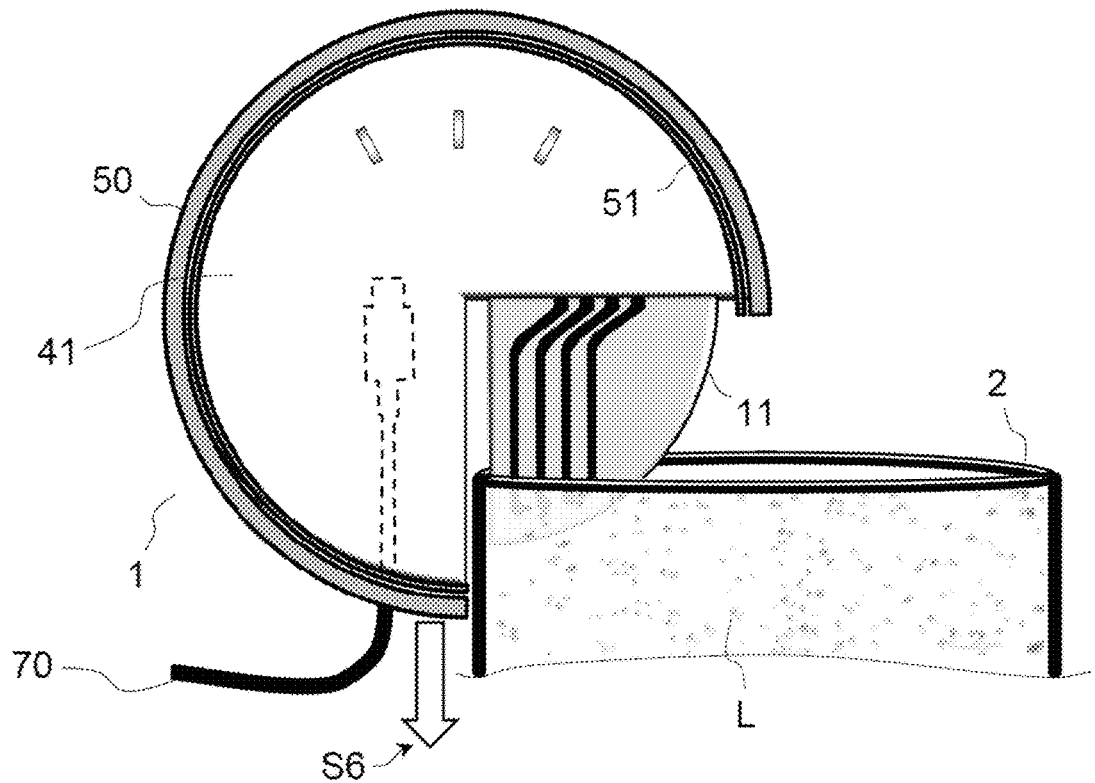

Once assembled, the portable sensor 1 can be slotted S6 onto the wall rim of a liquid containment vessel 2 by virtue of the open-ended gap g defined between the sensing part 11 of the probe 10 and the first surface portion P1 of the external surface of the portable sensor 1 for performing measurements, see FIG. 5C.

Figure 5D:
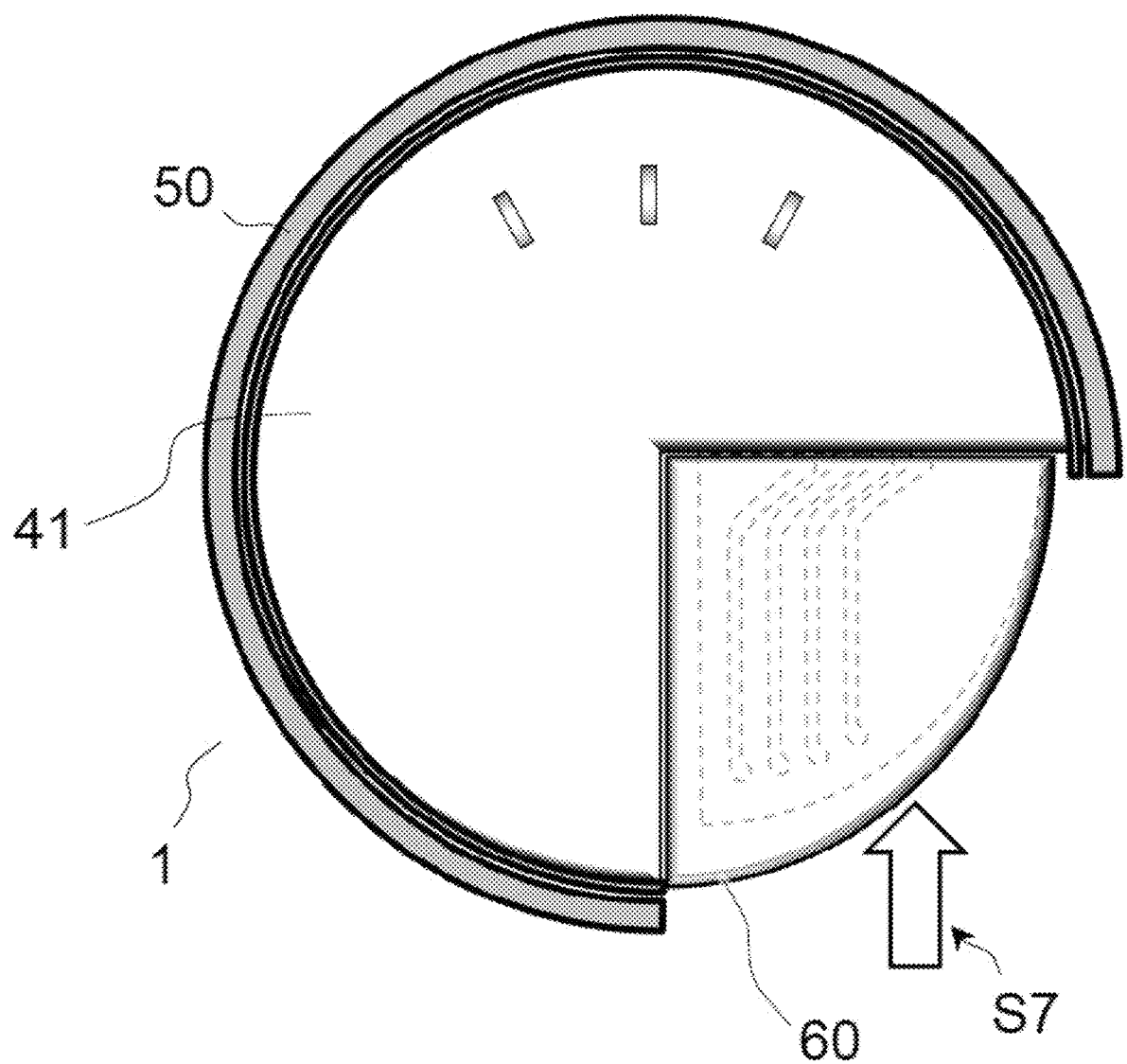
FIG. 5D depicts a side view of the portable sensor of FIG. 1 receiving a cap.

Referring now to FIG. 5D, the portable sensor 1 may, in embodiments, further comprises a cap 60 shaped complementarily to the cutout of the housing 41, 42. This cap 60 is configured to receive and cover S7 the probe 10 when inserted thereon (e.g., following the operation of portable sensor 1 gathering one or more measurements). The cap 60 may for example comprise a conditioning fluid or gel. After having performed measurements, the cap 60 is slotted onto the sensing part 11 of the probe 10 in order to protect and possibly condition the sensing elements 12, as illustrated in FIG. 5D. In addition, magnets may be arranged on outer surfaces (e.g., level therewith) of the cap 60, meant to come vis-à-vis, e.g., iron parts on the first surface portion P1 and/or the second surface portion P2 of the components of the housing 41, 42.

In general, the package components can be fabricated by injection molding with plastics. In particular applications, however, the housing 41, 42 and clamp 50 may be milled and turned out of engineering polymers such as ABS, POM, or PPO or, still, manufactured by additive manufacturing of poly(acrylic acid), PLA or epoxides. Milling and turning of metallic materials for the housing 41, 42 out of aluminum, aluminum alloys or other metal alloys may be advantageous for purposes of electromagnetic shielding of the electronics mounted on PCB 20.

Diameters for the housing 41, 42 may be in the range of 4 cm to 8 cm, with thicknesses between 0.5 cm and 3 cm. In some embodiments, the housing 41, 42 may be assembled with a total thickness of 1 cm and a diameter of 6 cm. The probe 10 may have a thickness in the range between 0.5 mm and 2.0 mm, with a thickness of 1.6 mm in some embodiments. The arrangement of probe 10 and housing 41, 42 may be configured to define the gap g between L1 and P2 to be between 1.0 mm and 4.0 mm wide (e.g., 2.0 mm), so as to accommodate the wall thickness of common drinking glasses, glass beakers, and other similar containers. The width of the gap g may be adjusted to accommodate other wall thicknesses.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A portable sensor comprising:
    a probe comprising a sensing part with one or more sensing elements configured to sense properties of a liquid, wherein the probe is an essentially planar substrate and the sensing elements include one or more electrodes on a major surface of the sensing part of the probe; and
    a housing defining both a first surface portion and a second surface portion, wherein:
        the housing is configured to secure the probe relative to the housing such that the sensing part protrudes from the second surface portion and thereby extends outside the housing in a direction substantially parallel to the to the first surface portion, thereby defining a gap between the first surface portion of the housing and a portion of a side surface of the sensing part of the probe, and
        the gap has an open end and a closed end, the closed end defined by the second surface portion of the housing, the open end as defined by the portable sensor configured to receive a rim of a liquid container.

2. The portable sensor according to claim 1, wherein the probe is removably fixed to the housing via a snap fit mechanism.

3. The portable sensor according to claim 2, further comprising:
    a printed circuit board (PCB) having electronic components thereon; and
    an elastically deformable clamp, wherein:
        the housing comprises two components configured to encapsulate the PCB;
        the sensing elements of the sensing part of the probe are connected to at least one of the electronic components; and
        the elastically deformable clamp is configured to secure the two components.

4. The portable sensor according to claim 3, wherein the housing is shaped as a partial cylinder and the elastically deformable clamp is shaped as a partial ring, wherein the housing is configured to be removably insertable and rotatable in the elastically deformable clamp.

5. The portable sensor according to claim 4, wherein:
    the elastically deformable clamp defines a linear slide in an inner curved surface of the partial ring;
    the inner curved surface is lined by elastically deformable edges; and
    the elastically deformable clamp is sized to receive the housing through a cutout of the elastically deformable clamp such that a side surface of the housing engages with the linear slide and is clamped by the elastically deformable edges.

6. The portable sensor according to claim 1, wherein the probe further comprises an insertion member that is configured to be removably inserted in a slot defined in the second surface portion of the external surface of the housing.

7. The portable sensor according to claim 6, further comprising a PCB with electronic components thereon, wherein:
    the one or more electrodes are connected to at least one of the electronic components, via the insertion member;
    the insertion member of the probe comprises one or more electrical pads; and
    the sensing part of the probe further comprises one or more electrical conductors connecting the electrodes to the electrical pads.

8. The portable sensor according to claim 7, wherein the housing and the insertion member form a snap-fit mechanism to removably attach the probe to the housing.

9. The portable sensor according to claim 8, wherein the PCB further comprises one or more spring-loaded connectors arranged so as to contact respective ones of the electrical pads of the insertion member upon inserting the insertion member in the slot, and the spring-loaded connectors form part of the snap-fit mechanism, whereby the probe is maintained in position after insertion of its insertion member in the slot, thanks to the spring-loaded connectors.

10. The portable sensor according to claim 1, wherein the first surface portion and the second surface portion of the housing meet to define a substantially a right angle relative to each other to define a cutout of the housing.

11. The portable sensor according to claim 10, wherein the portable sensor defines two major surfaces that are shaped as three quarters of a circle as a result of the cutout.

12. The portable sensor according to claim 11, further comprises a cap that is shaped complementarily to the cutout such that the cap is configured to receive and cover the probe.

13. The portable sensor according to claim 1, further comprising:
    a PCB with electronic components and a universal serial bus (USB) thereon; and
    an elastically deformable clamp that includes a radial slot, wherein:
        the housing comprises two components that define a conduit aligned with a direction of connection to the USB receptacle;
        the elastically deformable clamp is configured to secure the two components of the housing; and
        the slot is configured to align with the conduit upon rotating the housing in the clamp to enable a USB plug to be inserted through the slot and the conduit and connect to the USB receptacle.

14. The portable sensor according to claim 1, wherein the gap is between 1 and 4 mm.

15. A method comprising:
    receiving a rim of a liquid container via a gap defined by a portable sensor that includes:
        a probe comprising a sensing part with one or more sensing elements configured to sense one or more properties of a liquid of the liquid container; and
        a housing defining both a first surface portion and a second surface portion, wherein the housing is configured to secure the probe relative to the housing such that the sensing part protrudes from the second surface portion in a direction substantially parallel to the to the first surface portion to define the gap between the first surface portion of the housing and a portion of a side surface of the sensing part of the probe, the gap has an open end and a closed end, the closed end defined by the second surface portion of the housing, the open end defined by the portable sensor configured to receive a rim of a liquid container;

sensing, via the one or more sensing elements, the one or more properties of the liquid.

16. The method of claim 15, further comprising providing indicating of one or more sensing states via one or more light-emitting diodes (LEDs) of the portable sensor.

17. The method of claim 15, further comprising transferring, by the portable sensor, sensing data to an external computing device.

18. The method of claim 17, wherein the portable sensor transfers the sensing data via a universal serial bus.

19. A portable sensor comprising:
a probe comprising a sensing part with one or more sensing elements configured to sense properties of a liquid, the sensing elements including one or more electrodes;
a printed circuit board having electronic components and a universal serial bus (USB) thereon;
an elastically deformable clamp;
a housing comprising two components that together define a partial cylinder with a cutout that is defined by a first surface portion and a second surface portion of the housing, and a cap that is shaped complementarily to the cutout such that the cap is configured to receive and cover the probe, wherein:
the housing is configured to secure the probe relative to the housing such that the sensing part protrudes from the second surface portion and thereby extends outside the housing in a direction substantially parallel to the to the first surface portion, thereby defining a gap between the first surface portion of the housing and a portion of a side surface of the sensing part of the probe,
the gap has an open end and a closed end, the closed end defined by the second surface portion of the housing, the open end as defined by the portable sensor configured to receive a rim of a liquid container, and
the elastically deformable clamp is configured to secure the two components of the housing.

\* \* \* \* \*